US012528316B2

United States Patent
Hosu et al.

(10) Patent No.: US 12,528,316 B2
(45) Date of Patent: Jan. 20, 2026

(54) SYSTEM AND METHOD FOR AUTOMATIC TREADWEAR CLASSIFICATION

(71) Applicant: Volta Charging, LLC, San Francisco, CA (US)

(72) Inventors: Ionel-Alexandru Hosu, Bucharest (RO); David J. Klein, Los Altos, CA (US); Bradford T. Crist, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 417 days.

(21) Appl. No.: 17/724,630

(22) Filed: Apr. 20, 2022

(65) Prior Publication Data

US 2022/0339969 A1 Oct. 27, 2022

Related U.S. Application Data

(60) Provisional application No. 63/177,787, filed on Apr. 21, 2021.

(51) Int. Cl.
*G06V 10/82* (2022.01)
*B60C 11/24* (2006.01)
(Continued)

(52) U.S. Cl.
CPC .............. B60C 11/243 (2013.01); *G06T 3/00* (2013.01); *G06V 10/26* (2022.01); *G06V 10/764* (2022.01);
(Continued)

(58) Field of Classification Search
CPC ......... B60C 11/243; G06T 3/00; G06V 10/26; G06V 10/764; G06V 10/774; G06V 10/82; G06V 10/25; G07C 5/0816
See application file for complete search history.

(56) References Cited

U.S. PATENT DOCUMENTS 11,450,096 B2 * 9/2022 Tan ..................... G06V 10/7747
11,600,006 B2 * 3/2023 Biswas .................. G06V 10/82
(Continued)

FOREIGN PATENT DOCUMENTS

| CN | 109649091 A | 4/2019 |
| EP | 3243671 A1 | 11/2017 |
| WO | WO 2020/205640 A1 | 10/2020 |

OTHER PUBLICATIONS

Zhou, Zongwei, et al., "UNet++: Redesigning Skip Connections to Exploit Multiscale Features in Image Segmentation", IEEE transctns on Medical Imaging, vol. 39, No. 6, pp. 1856-1867, doi: 10.1109/TMI.2019.2959609, Dec. 2019, 12pgs.

(Continued)

*Primary Examiner* — Juan M Guillermety
(74) *Attorney, Agent, or Firm* — Hickman Becker Bingham Ledesma LLP

(57) ABSTRACT

A system and method are provided for automatically alerting drivers to potential tread ware problems to enable them to avoid the danger hazards associated with worn treads. A tread-evaluation station is placed at a location where images of tires may be captured. Images of tires are recorded when a vehicle is at or near the tread-evaluation station. An automated analysis is performed on the images. Based on the automated analysis, tires depicted in the captured images are classified into categories of wear. The automated analysis may include a detection component trained to detect tires in images, and a classification model trained to assign a classification to the wear status of the tires identified by the detection component. The tread-evaluation station may further be trained to predict when tires that do not currently need replacing will need replacing.

19 Claims, 18 Drawing Sheets

(51) Int. Cl.
*G06T 3/00* (2024.01)
*G06V 10/26* (2022.01)
*G06V 10/764* (2022.01)
*G06V 10/774* (2022.01)
*G07C 5/08* (2006.01)

(52) U.S. Cl.
CPC ............ *G06V 10/774* (2022.01); *G06V 10/82* (2022.01); *G07C 5/0816* (2013.01)

(56) References Cited

U.S. PATENT DOCUMENTS

| | | | |
|---|---|---|---|
| 12,090,795 B2* | 9/2024 | Laperle | G06T 7/001 |
| 2012/0207340 A1* | 8/2012 | Bulan | G06T 7/0004 |
| | | | 382/100 |
| 2016/0140424 A1* | 5/2016 | Wang | G06V 10/82 |
| | | | 382/156 |
| 2018/0268532 A1 | 9/2018 | Wang et al. | |
| 2020/0380695 A1* | 12/2020 | Zhou | G06T 7/11 |
| 2020/0394467 A1* | 12/2020 | Shimazu | G06F 18/217 |
| 2021/0061021 A1* | 3/2021 | Singh | B60C 11/246 |
| 2021/0114408 A1* | 4/2021 | Darolfi | G06T 7/50 |
| 2021/0118165 A1* | 4/2021 | Strong | G06T 7/60 |
| 2021/0197625 A1* | 7/2021 | Laperle | G06T 7/001 |
| 2021/0236080 A1* | 8/2021 | Herrmann | G06T 7/70 |
| 2021/0300133 A1* | 9/2021 | Tang | B60C 25/056 |
| 2021/0357645 A1* | 11/2021 | Messer | G06V 10/764 |
| 2022/0101489 A1* | 3/2022 | Nie | G06V 10/7715 |
| 2022/0366558 A1* | 11/2022 | Bufi | G01N 35/0099 |

OTHER PUBLICATIONS

Zhou, Zongwei, et al., "UNet++: A Nested U-Net Architecture for Medical Image Segmentation", DLMIA ML-CDS 2018, Springer, Cham, LNICS, vol. 11045, pp. 3-11, https://doi.org/10.1007/978-3-030-00889-5_1, publ Sep. 20, 2018, 8pgs.

Tan, Mingxing, et al., "EfficientNetV2: Smaller Models and Faster Training", Intl Conf on Machine Learning. PMLR 139, http://proceedings.mlr.press/v139/tan21a/tan21a.pdf, 2021, 11pgs.

Shorten, Connor, et al., "A survey on Image Data Augmentation for Deep Learning", Journal of Big Data, 2019, vol. 6, No. 60, https://journalofbigdata.springeropen.com/track/pdf/10.1186/s40537-019-0197-0.pdf, Jul. 6, 2019, 48pgs.

Jovancevic, Igor, "Exterior inspection of an aircraft using a Pan-Tilt-Zoom camera and a 3D scanner moved by a mobile robot: 2D image processing and 3D point cloud analysis", https://theses.hal.science/tel-01687831, Nov. 21, 2016, 227pgs.

International Bureau, "International Preliminary Report on Patentability", in International Application No. PCT/US2022/025475, dated Nov. 2, 2023, 9pgs.

Current Claims, in International Application No. PCT/US2022/025475, dated Nov. 2, 2023, 4pgs.

* cited by examiner

| Class | Precision | Recall | F1 |
|---|---|---|---|
| GOOD | 0.836 | 0.835 | 0.835 |
| OK | 0.839 | 0.795 | 0.817 |
| WORN | 0.749 | 0.827 | 0.786 |
| NOT_TIRE | 0.992 | 0.984 | 0.988 |

SYSTEM AND METHOD FOR AUTOMATIC TREADWEAR CLASSIFICATION

CROSS-REFERENCE TO RELATED APPLICATIONS; BENEFIT CLAIM

This application claims the benefit of Provisional Application 63/177,787, filed Apr. 21, 2021, the entire contents of which is hereby incorporated by reference as if fully set forth herein, under 35 U.S.C. § 119(e).

FIELD OF THE INVENTION

The present invention relates to automatic classification and, more specifically, a system and method for improving safety though performance of automatic treadwear classification.

BACKGROUND

Currently, tires need to be at least $2/32$ of an inch or 1.66 mm deep, according to the National Highway Traffic Safety Administration (NHTSA). Once tire tread drops to this "hazard point", the tires should be replaced. Many tires have tread-wear indicators, which are little bars in the tread that show when the tire is worn down to replacement level. Such tread-wear indicators will start making noise to alert the driver that the tires need attention.

Unfortunately, drivers of vehicles frequently fail check the tread state of their tires. Even when the tires include tread-wear indicators, many drivers are not aware of what the noise made by such indicators means. The failure to detect and replace worn tires can have severe consequences, including but not limited to experiencing dangerous control, braking and drivability problems. Further, continuing to use worn tires can lead to less obvious troubles, such as heat build-up, punctures, and hydroplaning. The problem of worn tires may be exacerbated by increased adoption of electric vehicles (EVs), since EVs generally need fewer service center visits, and in many cases it is only during such visits that tire condition is checked. Based on the foregoing, it is clearly desirable to provide a system that alerts drivers to worn tread states so the problem may be addressed and the potential dangers may be avoided.

BRIEF DESCRIPTION OF THE DRAWINGS

In the drawings:

FIG. 5 is a table that depicts performance of a classification model during a testing period, according to an implementation;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A system and method are provided for automatically alerting drivers to potential tread ware problems to enable them to avoid the danger hazards associated with worn treads. In one implementation, a system and method are provided for performing real-time detection and classification of tires.

In one embodiment, a tread-evaluation station is placed at a location where images of tires may be captured. Images of tires are recorded when a vehicle is at or near the tread-evaluation station. An automated analysis is performed on the images. Based on the automated analysis, tires depicted in the captured images are classified into three categories of wear: (GOOD, OK, WORN).

In one embodiment, the images are video captured by a camera that is located on or near an electric vehicle (EV) charging station. In such an embodiment, the camera may capture a video of an electric vehicle as the vehicle approaches or is stopped at the EV charging station to be charged. In one implementation, the video input thus captured is split into individual frames, which are pre-processed and used as input for a detection model.

In cases where the automated analysis performed by the detection model determines that a vehicles tires are "worn", the tread-evaluation station may generate an alert to notify the user of the vehicle that the tires need attention. The alert may take any number of forms, and the techniques described herein are not limited to any particular form of alert. For example, the alerts may be visual and include flashing lights, a "red" light, or a video display on a display screen operatively connected to the tread-evaluation station. Alternatively, the alert may be audible, such as an alarm or the playing of an audio recording that states "tires need replacement" or a similar message. By notifying drivers when they need tire replacements, tread-evaluation stations protect their safety and build trust. Tire wear results in slippage, a longer braking distance, and even flat tires, which can eventually result in a driving accident. The alert may be delivered in any number of ways, including but not limited to a mobile app used by EV drivers to check-in, authenticate, and pay for their charge session.

Object Detection Model Architecture

Figure 1:
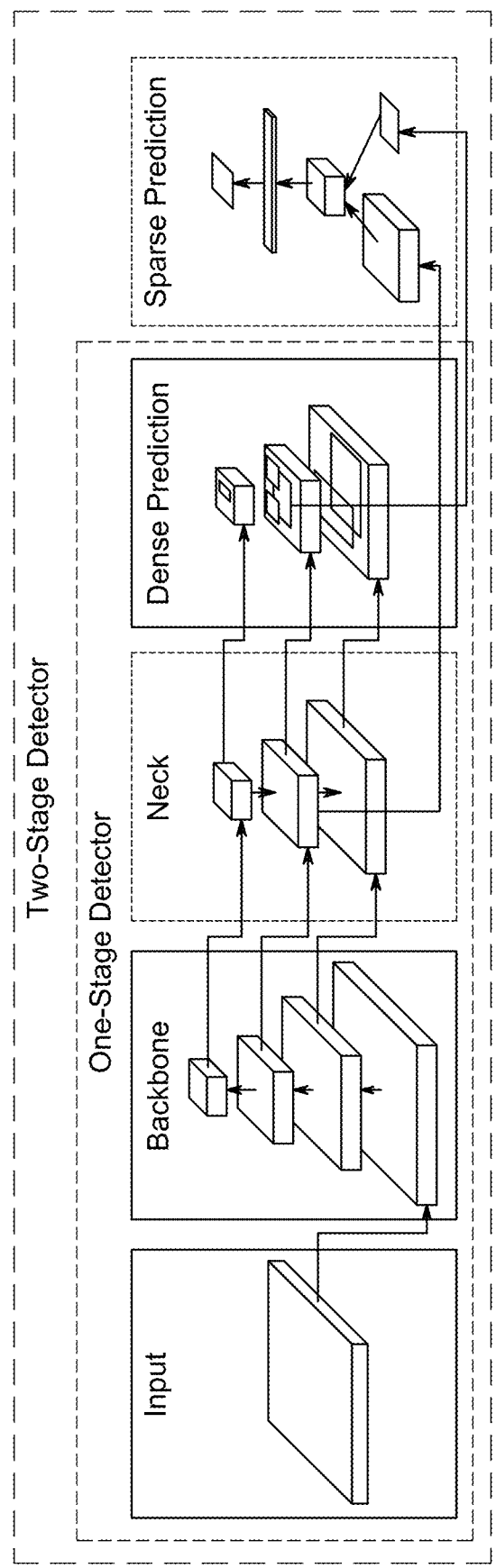
FIG. 1 is a block diagram of a high-level overview of an architecture for an object detection system, according to an implementation.
Figure 2:
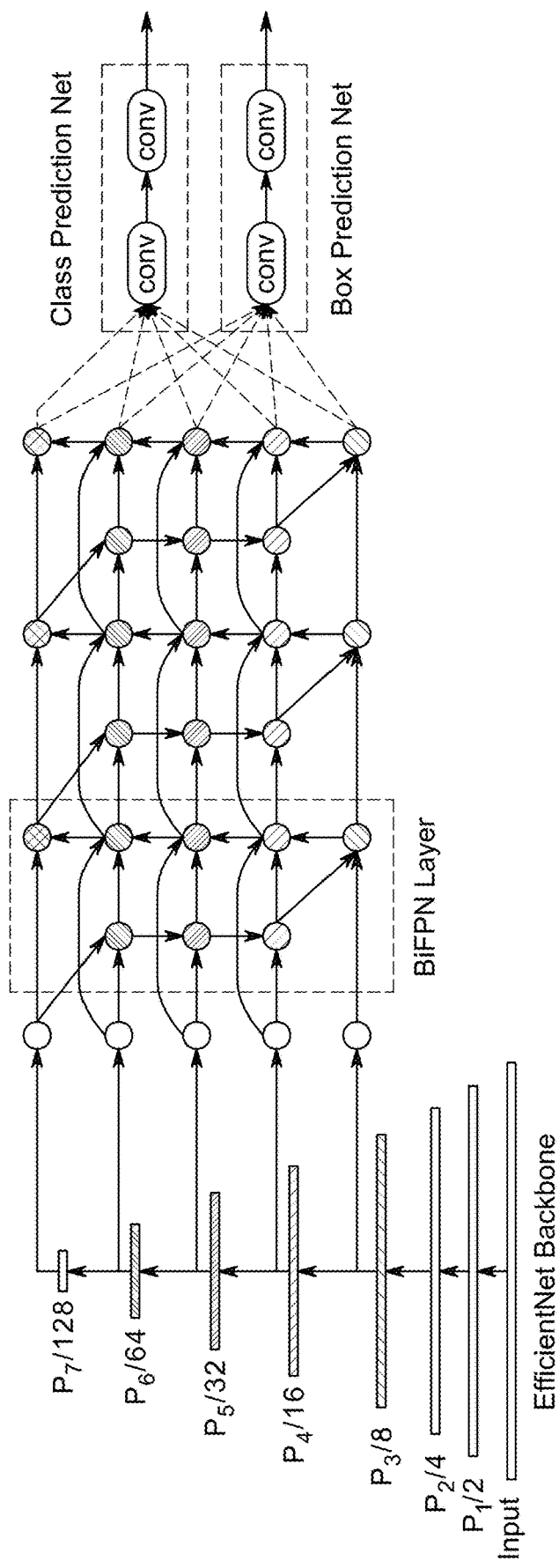
FIG. 2 is a block diagram of a more detailed view of an architecture for an object detection system, according to an implementation.

As mentioned above, a tread-evaluation station uses a detection model to identify tires depicted in captured images and categorize the tread-state of the tires thus identified. Referring to FIG. 1, it is a block diagram of an architecture for an object detection system that may be used to identify tires and categorize the tread-state of the tires. FIG. 2 provides a more detailed view of the architecture of the object detection system.

According to one embodiment, the object detection system takes an image consisting of an individual frame from a video feed, performs tire detection and outputs bounding boxes corresponding to the locations of tires in the image. The contents of the resulting bounding boxes are used as inputs for the classification model that performs individual classification and voting in order to predict a single wear level for a tire depicted in the input image.

Data Processing and Data Augmentation of Object Detection Model

In one embodiment, as preprocessing steps, the tread-evaluation station downscales the images to 640p resolution, and uses OpenCV to perform contrast enhancement and brightness adjustment. OpenCV is a software tool for processing images and video. Further details regarding OpenCV are available at www.intel.com/content/www/us/en/developer/articles/technical/what-is-opencv.html, the contents of which are incorporated herein by this reference.

Figure 3:
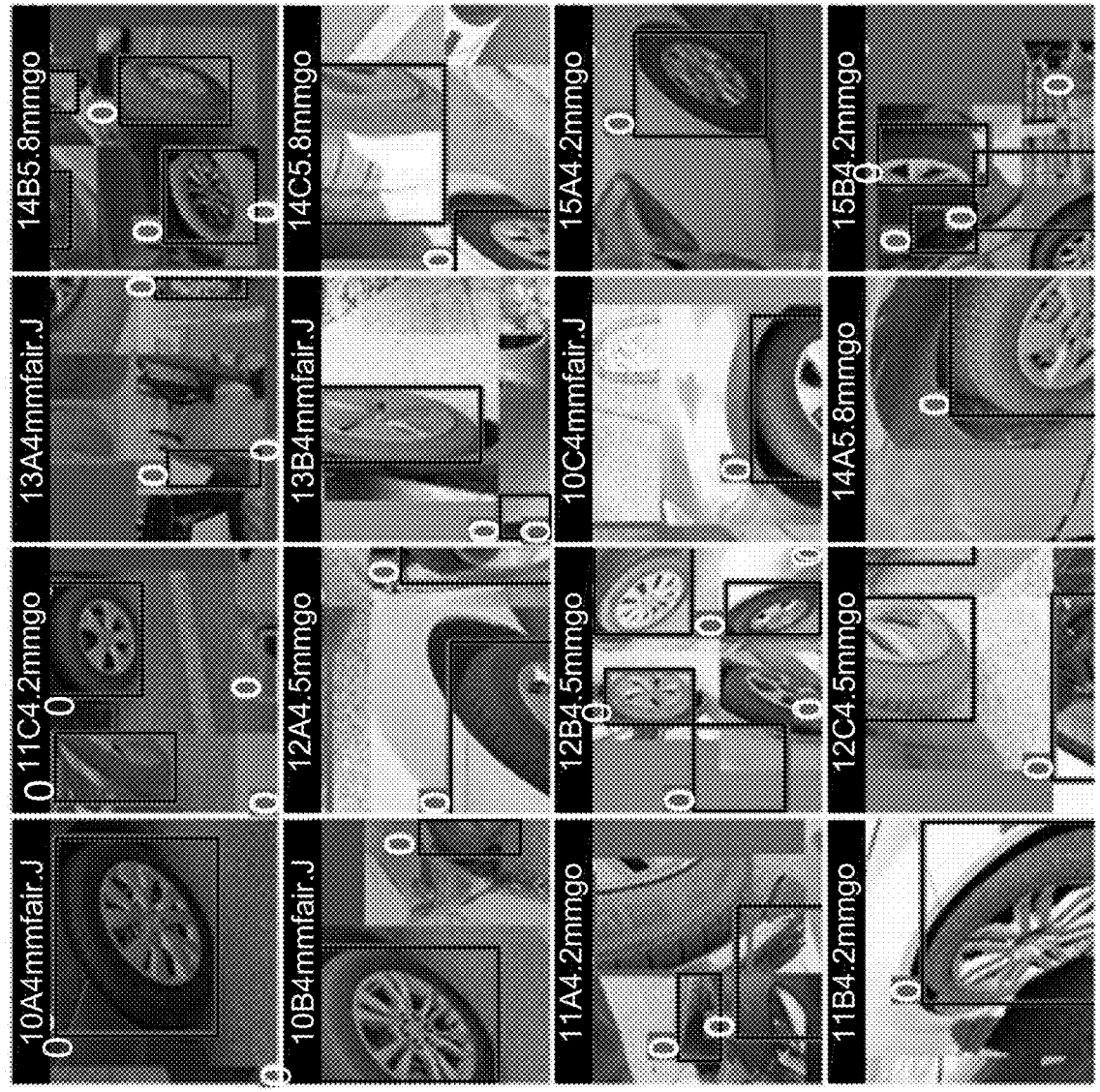
FIG. 3 is a block diagram illustrating a batch of 16 inputs to the detection model using mosaic data augmentation, according to an implementation.

Data augmentation is an important step in training machine learning models on small datasets. In one embodiment, the tread-evaluation station uses various augmentation procedures used such as mosaic, normalization, random perspective, and colorspace augmentation. Mosaic data augmentation combines four training images in a single one, by overlaying them on top of each other, at different scales and also adding a degree of transparency. This allows the model to learn how to identify objects at smaller scales, as well as artificially introducing a degree of variety in location. FIG. 3. is a block diagram illustrating a batch of 16 inputs to the detection model using mosaic data augmentation.

Training a Machine Learning Engine to Detect Tires

The tread-evaluation station may use any one of a variety of techniques for training a machine learning engine to detect tires within captured images. The techniques described herein are not limited to any particular training technique. In one embodiment, the tread-evaluation station uses a model that is pre-trained on the Microsoft COCO dataset ("Common Objects in Context") and is further finetuned on a set of 15,000 consisting of car images labelled with bounding boxes around individual tires.

In one embodiment, this dataset is split by car into 80% of the images for training and the remaining 20% for validation. Based on test using this training technique, the resulting model obtains an IOU score of around 0.95 on the validation dataset.

Post Processing

The tire detection post-processing is one of the most important aspects of developing an accurate tread evaluation system. In one embodiment, the training dataset consists of digital single-lens reflex (DSLR) and smartphone camera images and the production level data is coming from a 2 MP video feed. In such an embodiment, there may be fine differences which amount to faulty predictions in some scenarios, consisting mostly of false positives.

In one embodiment, in order to filter out false positives, the tread-evaluation station performs detection on multiple frames every second. After that, the tread-evaluation station checks for the consistency of predicted bounding boxes. False positives tend to be inconsistent in consecutive frames (e.g. predicted bounding boxes appear and disappear in consecutive frames). Based on this heuristic, the tread-evaluation station may drop a significant number of predictions, which represent mostly false positive predictions.

In one embodiment, in order to further improve the detection performance, the tread-evaluation station also makes use of the classification mode, which is also used to recognize images that don't contain tires (NOT_TIRE class).

Classification Model

Figure 4:
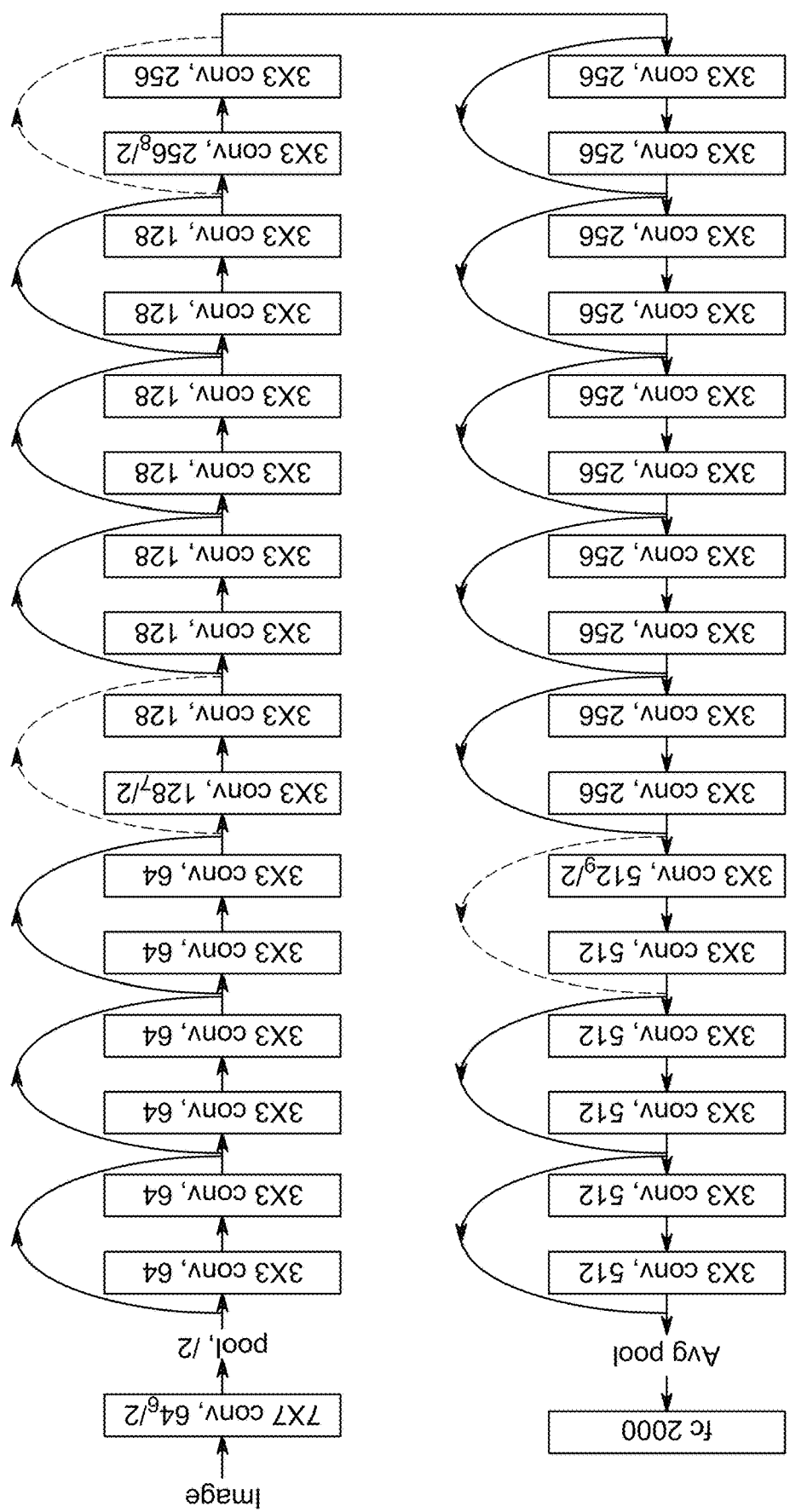
FIG. 4 depicts a convolutional neural network with residual blocks, according to an implementation.
Figure 6A:
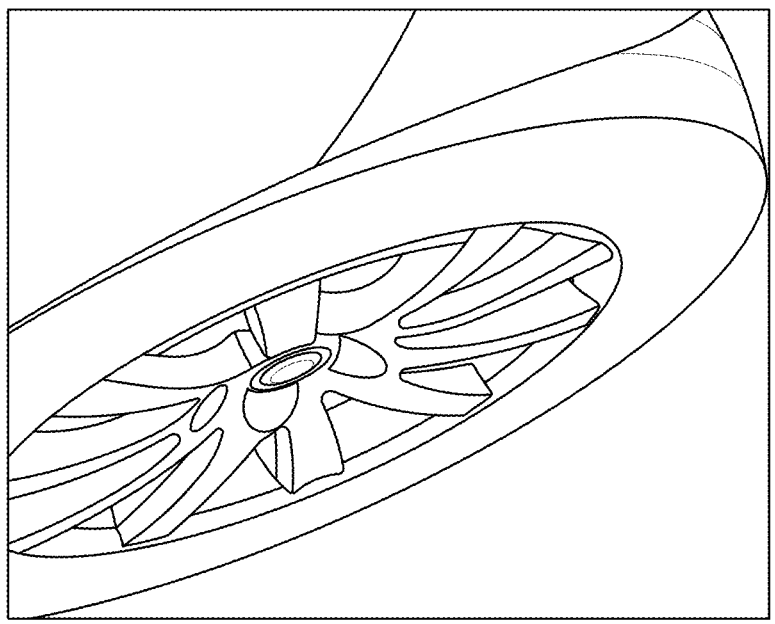
FIG. 6A-6I are images, depicting tires, that may be used to train a object detection system to detect tires within images.
Figure 6B:
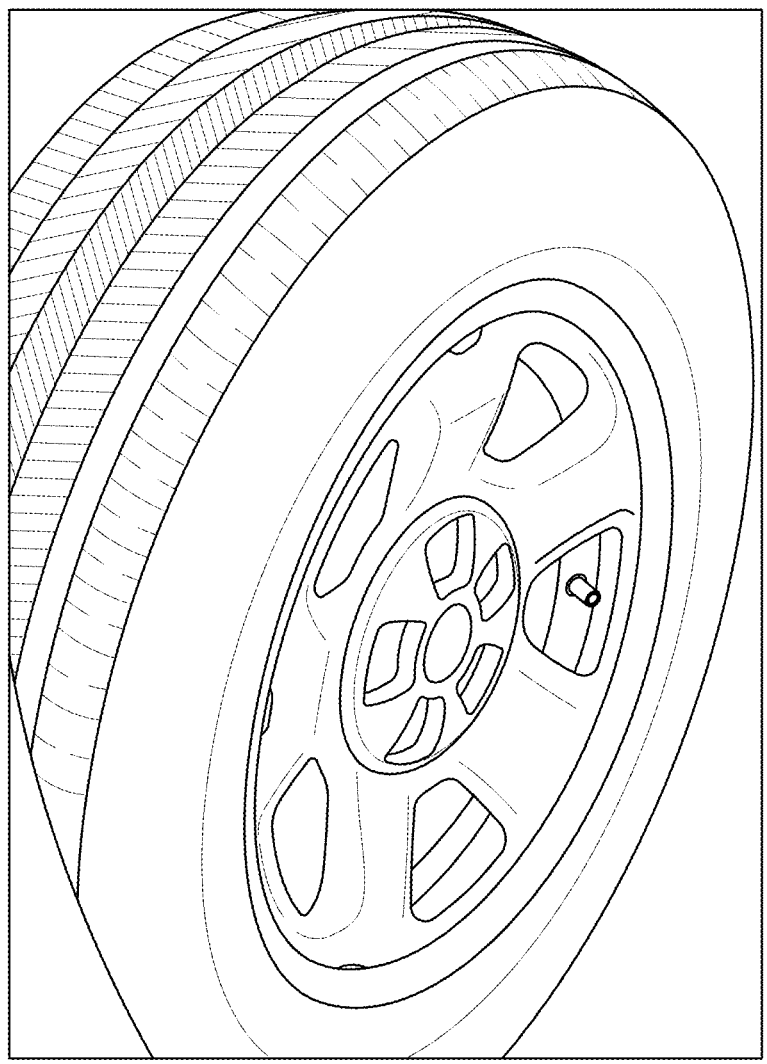
Figure 6C:
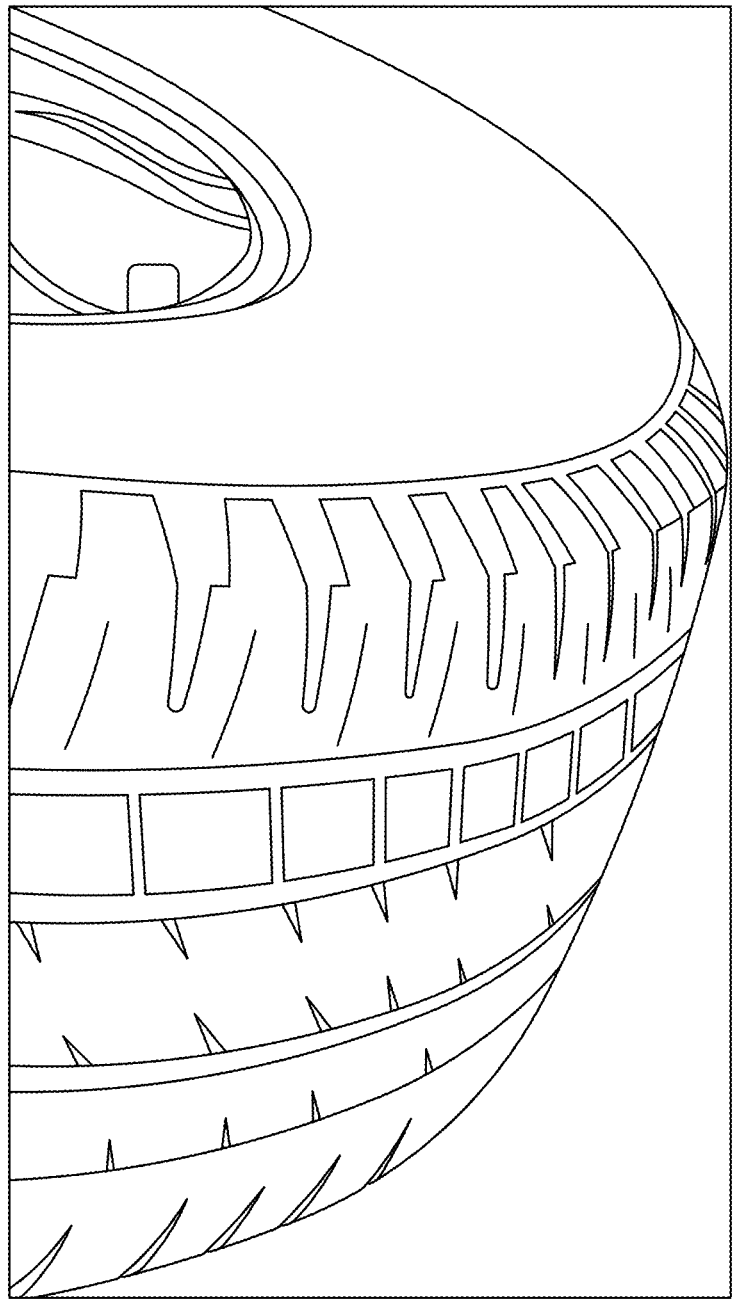
Figure 6D:
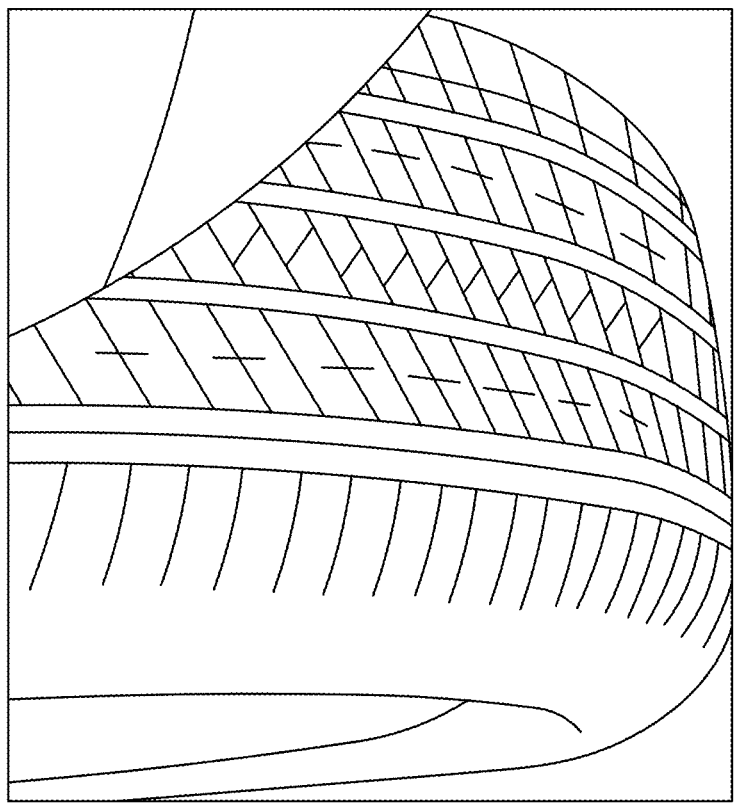
Figure 6E:
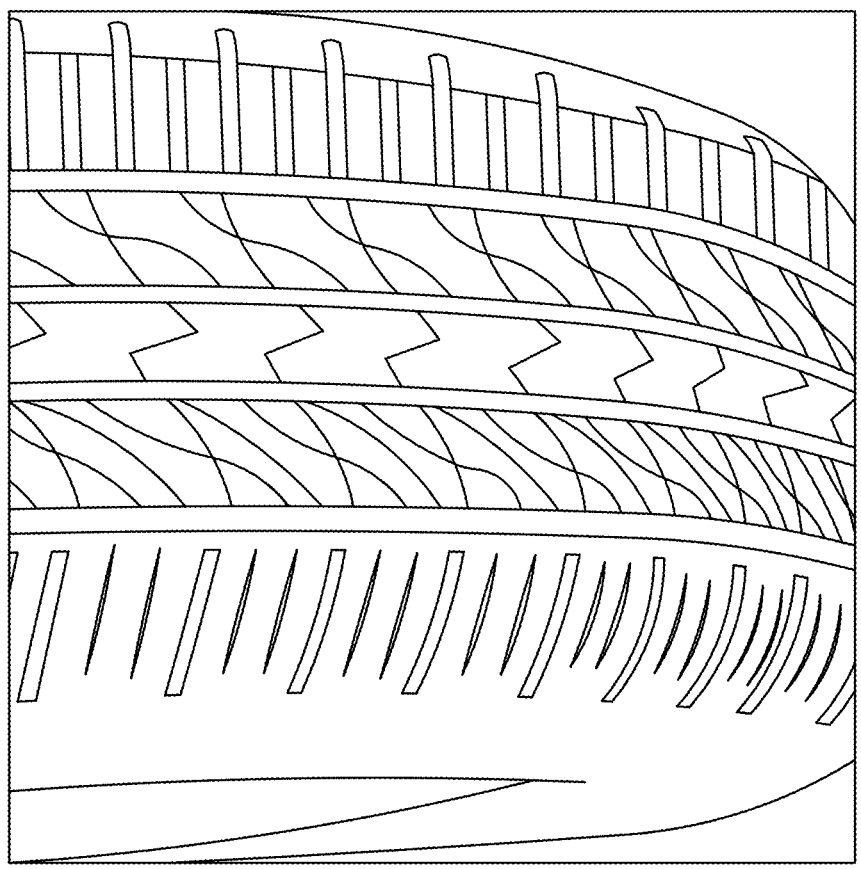
Figure 6F:
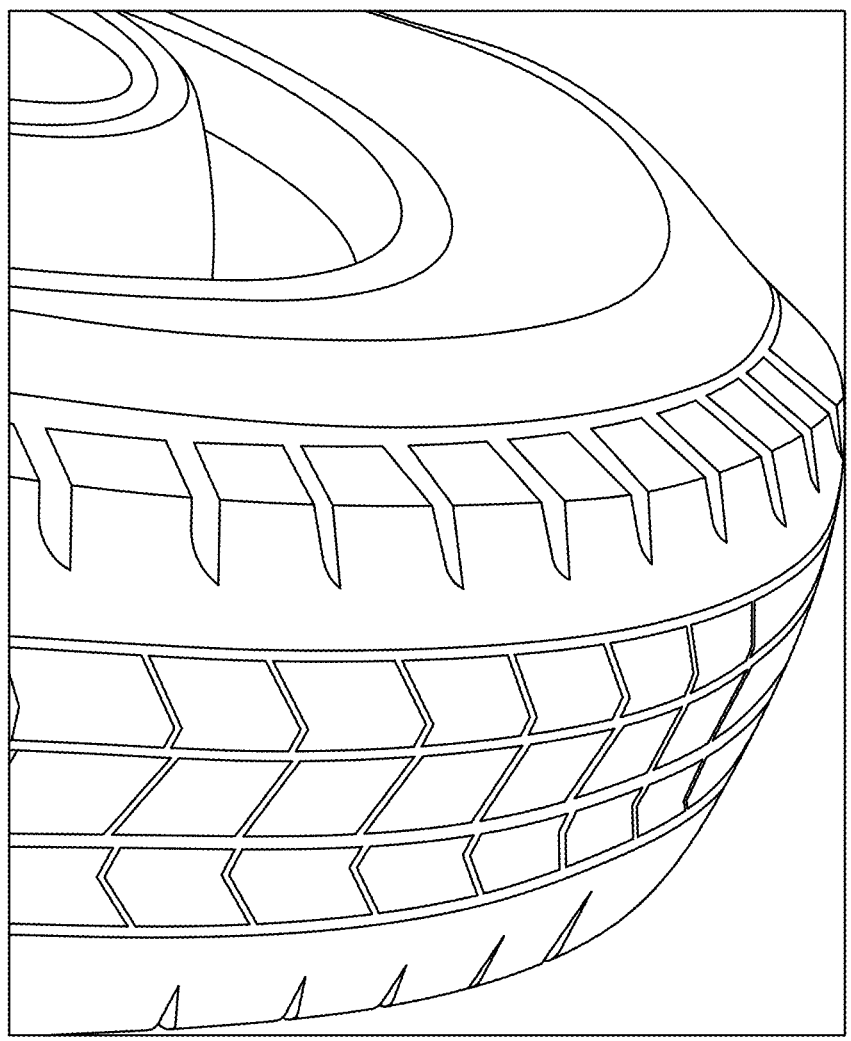
Figure 6G:
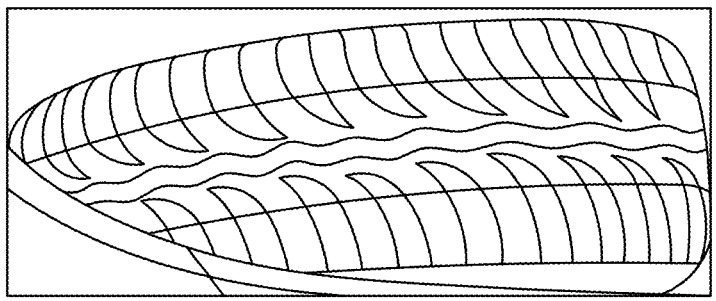
Figure 6H:
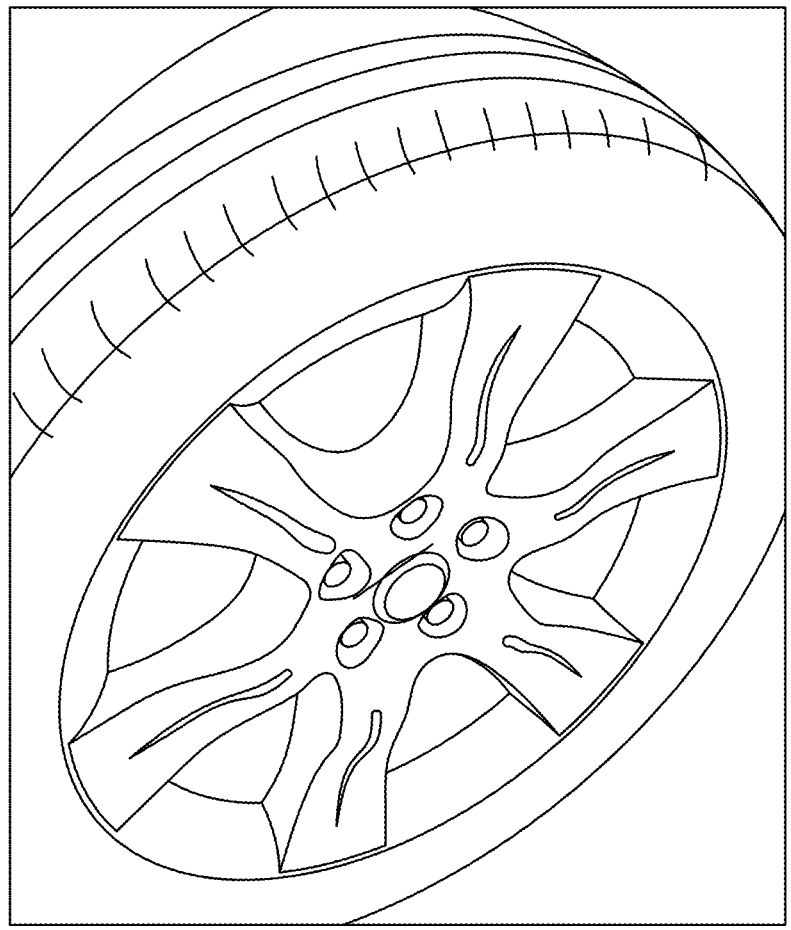
Figure 6I:
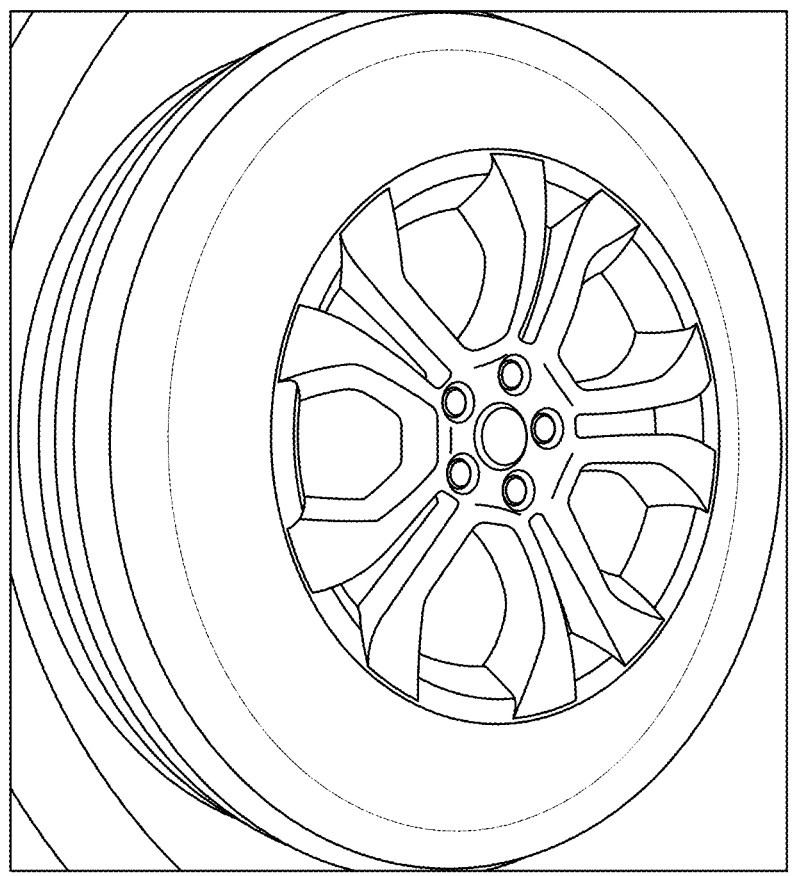

In one embodiment, the classification model is based on the ResNet152 architecture, which is depicted in FIG. 4. Referring to FIG. 4, it represents a convolutional neural network with residual blocks. Additional details regarding ResNet152 may be found, for example, at www.kaggle.com/pytorch/resnet152, the contents of which are incorporated herein by this reference.

Data Processing and Data Augmentation of Classification Model

In one embodiment, the tread-evaluation station applies one or more of the following transformations to input images:

```
Train images:
Resize(IMG_SIZE * resize_factor)
RandomHorizontalFlip( )
RandomVerticalFlip( )
RandomCrop(IMG_SIZE)
GaussianBlur( ) of kernel 5, with probability 0.5
Normalize( )
Validation images and production (inference time):
Resize(IMG_SIZE)
CenterCrop(IMG_SIZE)
Normalize( )
Parameters:
IMG_SIZE = 336
resize_factor = 1.1
```

In one embodiment, during the training phase of the classification model, there may be even more transformations, most of them implying random choices, in order to train the model to be more robust to different changes (flipped images, blurred images).

In one embodiment, using Resize (IMG_SIZE*resize_factor) and then RandomCrop(IMG_SIZE) ensures that only ~83% of the image will be used (different 83% every time). Thus, it will be more difficult for the model to overfit the training data, as the model would see slightly different images on every iteration.

A smaller percent may be even better for this purpose (e.g. resize_factor 1.2=>69% of the image), but a smaller percent increases the probability of keeping a crop that doesn't contain the treads, thereby affecting performance.

When using the model for inference, it is desirable for the prediction to be the same for different runs. This implies removing all the random transformations and only performing deterministic transformations. Consequently, in one embodiment, the tread-evaluation station resizes the image straight to the desired size, and then takes its center.

In one embodiment, the class distribution for the tire dataset is the following: WORN—9%, OK—58%, GOOD—33%.

For increased confidence, the tread-evaluation station may generate tread depth predictions on multiple images of the same tire. Thus, a prediction that a tire's condition is "BALD" will have higher confidence if 4 of 4 photos of the tire are independently assigned the same classification of "BALD".

Training a Machine Learning Engine to Classify Treads

In one embodiment, the tread wear classification component of the tread-evaluation station uses a model that was trained for 100 epochs on a tire dataset consisting of 2,500 images manually labelled with bounding boxes around tires. More specifically, the images were cropped in the respective bounding boxes for the [GOOD, OK, WORN] classes and additional random patches were cropped from the same images for the NOT_TIRE class.

The performance of the classification model during one testing period is outlined in the table illustrated in FIG. 5. During this testing period, the overall accuracy of the model on the test data is 85% on the tire images, excluding the NOT_TIRE class, which would artificially increase the accuracy, being vastly easier to identify.

Tread-Evaluation Stations

Tread-evaluation stations may prove beneficial in a variety of ways, Specifically, such stations may recognize bald tires after having been trained using a representative dataset of tire images. In one embodiment, the tread-evaluation stations determine tire wear states (good, worn, bald) by classifying images from cameras. Further, in some embodiments, the tread-evaluation stations may further estimate wear rates and use the estimated wear rates to predict when tires will wear out. Based on this information, the tread-evaluation stations may perform a variety of responsive actions. For example, based on the determined condition of a user's tire treads, the tread-evaluation station may generate an alert that indicates new tires are needed. In situations where new tires are not needed, the tread-evaluation station may generate an alert that indicates the predicted remaining life of a user's tires. Instead of or in addition to such alerts, the tread-evaluation station may play targeted ads on a media display based on the driver's tire conditions.

Building a Test Dataset

According to one embodiment, a test dataset for the tread-evaluation station may be produced by taking photos of tires with a high quality DSLR camera. Examples of photos that may be taken during this process are shown in FIGS. 6A-6I. Once such photos are acquired, tread depth of the photographed tires may be measured. Based on the measurements, each photo may be classified into 1 of 3 buckets: bald/worn/good. The photos may then be labelled accordingly (i.e., Tire 3/32 Worn)

In one embodiment, the tread-evaluation stations are combined or co-located with electric vehicle (EV) charging stations. In such an embodiment, cameras connected to or incorporated into the charging stations may be used to capture and save tire photos while EVs are charging at the charging stations.

Preferably, the training set would include 200+ photos of each tire wear classification (bald, worn, good). Images should take into account camera height, viewing angle, lighting conditions, pixels, and compression.

In embodiments where cameras associated with EV charging stations are used to build a dataset, there may not be much control over the viewing angle (i.e., station placement in the field). Consequently, of such embodiments, the test data set preferably includes images captured in every viewing angle of 15 degree increments, various lighting conditions, and ideally at the height of the EV charging station's vehicle recognition cameras.

Classifying Tire Wear

To train the classification model, classifications are assigned the tires in the images of the training set. Various factors may be considered when assigning a classification to a tire depicted in the training set, including but not limited to:

Tread depth—Using a tire gauge, balancing the base across the molded tread and pushing down the central probe. When the gauge is removed, it should report the measurement.

"Penny test"—Place a penny head first into several tread grooves across the tire. If you see the top of Lincoln's head, your treads are shallow and worn. If part of Lincoln's head is always covered by the tread, you have more than 2/32" of tread depth remaining.

Tread pattern—Most tires have intentionally placed "tread wear bars" as easy, indicators of tire deterioration. These are flat rubber bars running perpendicular to the treads and they gradually appear as the tires are worn down. However, most tires wear first on the shoulder, so we should consider other wear patterns.

Irregular the wear—Two common causes for this situation: improper inflation pressure or out-of-spec alignment. Improper inflation can cause tires to wear rapidly or unevenly.

Sidewall crack or bubble—While signs of shallow cracking on the sidewall rubber or minor irregular wear are of concern, the presence of a bubble in the tire sidewall is a major safety concern that needs to be addressed immediately.

Adjustments and Variations

Various adjustments may be made to improve performance and accuracy of the tread-evaluation station. For example, accuracy may be improved by performing image segmentation that crops the tire out. Further, accuracy may be improved by estimating tire rotation angle, extracting tread and warping the angle so that it looks front facing. Further, the image analysis may focus on specific zones of that normalized tread image, such as the center zone or edge zone.

According to one embodiment, the tread-evaluation station is configured to perform separate classification for different zones (inside shoulder, centerline, outside shoulder), since on the same tire each of these can have different wear. In one embodiment, if the tire is classified as worn in any of those three areas, then the tread-evaluation station classifies the entire tire as "worn".

In one embodiment, the tread-evaluation station is configured to distinguish between "Irregular wear" and "global wear". Any alerts triggered by a "worn" determination may indicate which type of wear has been detected.

To improve accuracy of the tread-evaluation station, one may perform experiments to determine the sensitivity of the tread-evaluation station's accuracy to varying:
- viewing angles
- viewing heights
- distances & pixel resolutions (ultimately the # of pixels covering the tire)
- times of day
- vehicle classes/sizes of tires
- shadows/sun angles
- weather conditions How to Build the Training Dataset According to one embodiment, a training set of photos may be generated based on the use of a smartphone camera and a tire tread gauge. Specifically, in one embodiment, one may generate the training set by taking photos of cars in a parking lot or garage, ideally with a variety of tire conditions (new, ok, worn, and bald tires). For example, using a smartphone, on may take two to three photos of a tire from a couple of top down/sideways orientations. For accurate classification, the tire treads should be at least partially visible in the photos.

Using the tire tread gauge, one may measure the tire that was photographed by inserting the gauge between the middle treads of the tire. The user may record (a) the tire's tread depth in millimeters, and (b) which tire had which measurement.

After taking a batch of photos, the user may electronically label each tire photo with the appropriate tread measure: Tire1A 3.2 mm, Tire1B 3.2 mm, Tire2A 5.0 mm, Tire2B 5.0 mm, and so forth Wear Prediction Instead of, or in addition to, training a machine learning engine to classify the wear status of tires, a machine learning engine may be trained to predict a duration of time until a tire's tread is "worn". The timing of the "worn" prediction may be used to trigger various alerts and/or actions. For example, if a tread-evaluation station predicts that a particular driver's tires will be worn in six months, then the tread-evaluation station may schedule a "worn tire alert" to be sent to the driver (e.g. by email or text) in five months. The alert may be accompanied by relevant materials, such as a coupon for a discount on new tires.

Further, predictive weather intelligence may be combined with tire tread recognition. In an tread-evaluation station that combines tire wear and weather information may be configures to generate sophisticated alerts based on the information, such as: "The roads are icy and slick, and your tires are likely to wear out in 2-3 months. Consider replacing them with 15% off Tire Rack (scan QR code coupon here). Drive safely!"

Alternative Implementation

Various techniques may be used to implement a tread-evaluation station. For example, an alternative technique to that previously described may combine the use of UNet++ segmentation architecture with the EfficientNetV2 classification architecture. In one implementation, such an embodiment differs from the embodiments described above in a variety of ways, including:

- Rather than classifying images into the categories [GOOD,OK,WORN,NOT_TIRE], images are classified into the categories [GOOD,OK,WORN,BALD]. Thus, a new wear level (BALD) is introduced. In such an embodiment, there is no need for a NOT_TIRE class anymore, and the depth intervals for the wear classes have been changed from {[0;3], [3;6], [6+]} to {[0;2], [2;4], [4;6], [6+]}.
- The need for a NOT_TIRE class changed because the detection model has been replaced with a semantic segmentation model, which may be a lot more robust. Consequently, the possibility of an inexistent tire being detected as a tire and going into the classification model is nearing zero.

The UNet++ segmentation architecture is described, for example, at github.com/MrGiovanni/UNetPlusPlus, the content of which is incorporated herein by reference.

In such an implementation, real-time segmentation and classification of tires is performed by video input. The video input may be provided by a 2 MP camera that is co-located with an EV charging station. In one embodiment, the tires are classified into the four categories of "Good", "OK", "WORN", and "BALD".

In one embodiment, the video input is split into individual frames, which are pre-processed and used as input for the detection model, which is based on the UNet++ semantic segmentation architecture mentioned above.

The wear classes correspond to intervals of tread depth for the most worn tread on the tire surface. Therefore, the tire tread with the lowest depth dictates the wear level of the tire. The intervals of depth for all the wear classes are as follows:

BALD—0 to 2 mm

WORN—2 to 4 mm.

OK—4 to 6 mm.

GOOD—above 6 mm.

Figure 8:
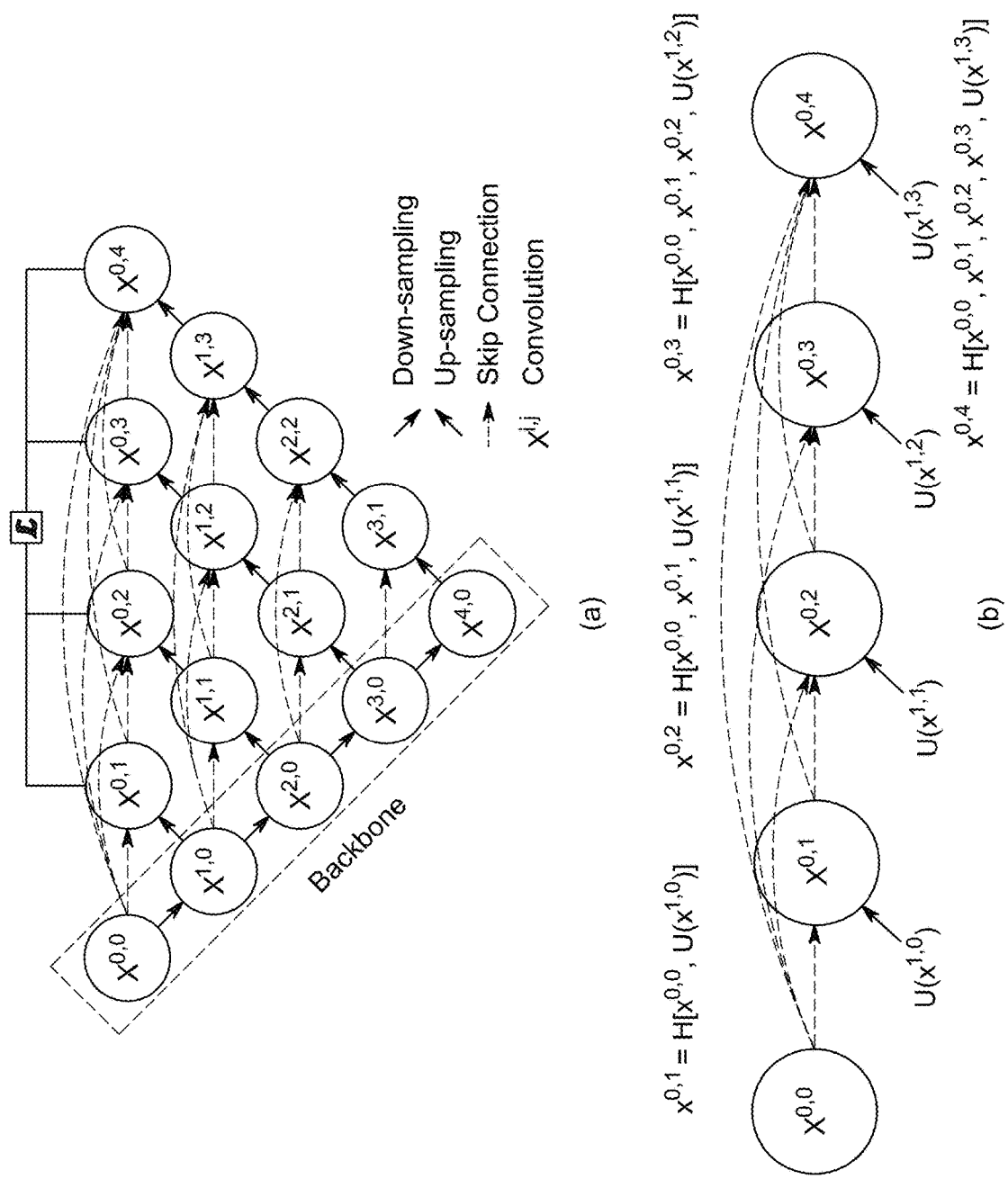
FIG. 8 is a schematic representation of the UNet++ architecture that may be used to perform semantic segmentation of images, according to an implementation.
Figure 8:
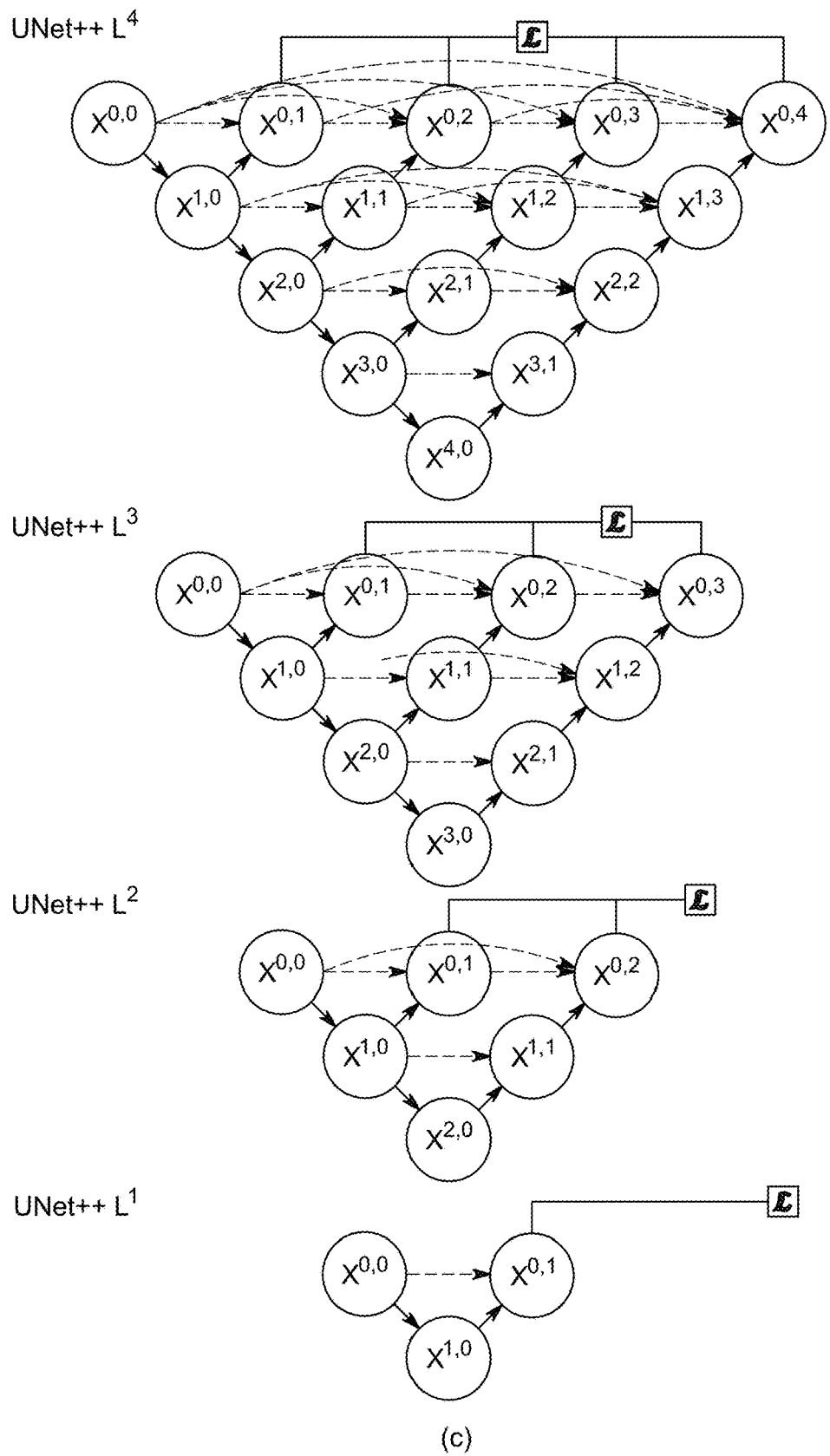

Referring to FIG. 8, it is a schematic representation of the UNet++ Architecture that may be used in one implementation of a tread-evaluation station. Specifically, region (a) of FIG. 8 illustrates that UNet++ includes an encoder and decoder that are connected through a series of nested dense convolutional blocks. The main idea behind UNet++ is to bridge the semantic gap between the feature maps of the encoder and decoder prior to fusion. For example, the semantic gap between (X0,0,X1,3) is bridged using a dense convolution block with three convolution layers. In the graphical abstract, black indicates the original U-Net, green and blue show dense convolution blocks on the skip pathways, and red indicates deep supervision. Red, green, and blue components distinguish UNet++ from U-Net.

Region (b) of FIG. 8 illustrates a detailed analysis of the first skip pathway of UNet++. Region (c) of FIG. 8 illustrates that UNet++ can be pruned at inference time, if trained with deep supervision.kip pathway of UNet++.

In a tread-evaluation station that employs the UNet++ architecture illustrated in FIG. 8, the segmentation model takes an image consisting of an individual frame from a video feed, performs tire segmentation and outputs a pixel wise segmentation mask corresponding to the location of a tire in the image. The content of the resulting segmentation mask is used to highlight the tire in the original image, which is then used as input for the classification model, which then performs individual classification and voting in order to predict a single wear level for the input image.

In one embodiment, the segmentation model is trained on a dataset of 1500 images containing tires, that were manually labeled with segmentation masks (contours drawn manually around the tire). This dataset is split by car into 80% of the images for training and the remaining 20% for validation. The resulting model obtains an IOU score of around 0.95 on the validation dataset.

Figure 9:
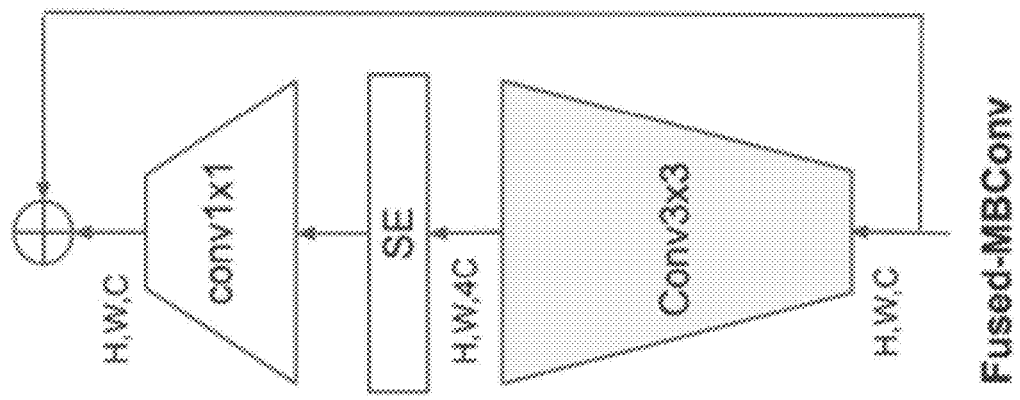
FIG. 9 is a block diagram illustrating the structure of convolution blocks used in the EfficientNetV2 neural network architecture that may be used to classify the wear state of tires, according to one implementation.
Figure 9:
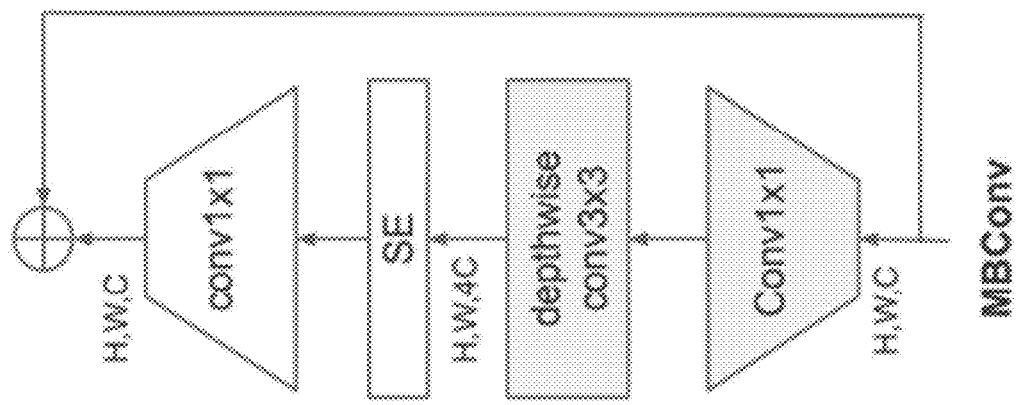

A tread-evaluation station may use the UNet++ segmentation model in conjunction with a classification model that is based on the EfficientNetV2 neural network architecture. The EfficientNetV2 neural network architecture is described at github.com/google/automl/tree/master/efficientnetv2, the contents of which are incorporated herein by reference. FIG. 9 illustrates the structure of MBConv and Fused-MBConv, convolution blocks used in the EfficientNetV2 neural network architecture.

In such a tread-evaluation station, the EfficientNetV2 neural network is train to take an image that represents a close-up of a tire, in which the tire is highlighted using the segmentation mask generated by the segmentation model. On this resulting image, the classification model performs image classification into four wear levels: BALD, WORN, OK, GOOD.

In one implementation, the model is trained on a 20,000 image dataset containing close-ups of tires. The dataset may be, for example, collected using smartphones and DSLR cameras. All the images in the dataset are accompanied by their corresponding depth of the most shallow tread, which provides the wear level of the tire.

A classification model trained in this manner has been evaluated on a 500 image dataset consisting of close-ups of tires. This evaluation dataset was collected in the same manner as the training dataset. The main difference between the two is that the evaluation dataset was curated. This procedure consisted of the removal of images that were too noisy, unclear, dark or in which the tires were dirty or muddy, thus making it unreasonably difficult to correctly predict the wear level of the tires. In one test run, feeding the evaluation dataset to a tread-evaluation station implemented in this manner produced class level F1-scores as follows: BOLD: 0.71, WORN: 0.72, OK: 0.71, and GOOD: 0.75.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
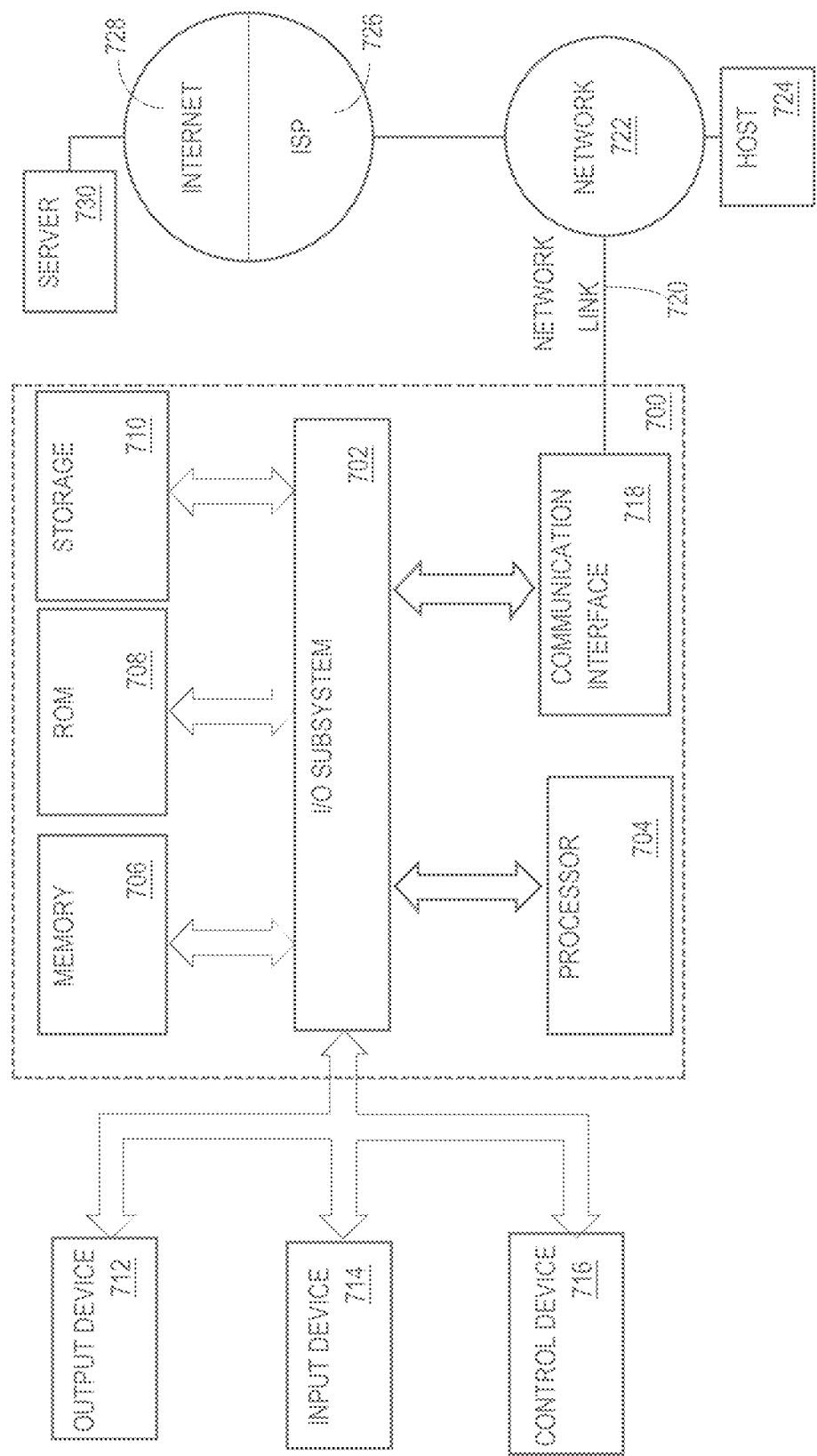
FIG. 7 is a block diagram of a computer system that may be used to implement the various actions executed by the wear evaluation station described herein.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:

capturing one or more digital images that include a depiction of a tire, wherein the one or more digital images are captured by one or more cameras incorporated into an electric vehicle charging station as a vehicle that includes the tire approaches or is parked at the electric vehicle charging station, wherein the electric vehicle charging station includes a computing device;

generating, by the computing device of the electric vehicle charging station using an object detection model trained on a first dataset of images containing tires, a representation of a location of the tire for each digital image in the one or more digital images, wherein:

the object detection model comprises a semantic segmentation model; and the representation of the location of the tire comprises a pixel-wise segmentation mask that highlights the location of the tire in the digital image;

providing, by the computing device of the electric vehicle charging station, the one or more digital images and corresponding representations of the location of the tire to a classification model trained on a second dataset of images consisting of close-up views of tires;

generating, by the computing device of the electric vehicle charging station using the classification model, a classification of the tread of the tire based on the one or more digital images and the corresponding representations of the location of the tire;

determining, by the computing device of the electric vehicle charging station using a trained machine learning engine based at least in part on the classification of the tread of the tire, a predicted remaining life of the tire representing a duration of time until the tread of the tire will be worn;

generating, by the computing device of the electric vehicle charging station, an alert that is based, at least in part, on a classification of the tread of the tire and the predicted remaining life of the tire; and causing the alert to be displayed on a display associated with the electric vehicle charging station.

2. The method of claim 1 wherein the semantic segmentation model operates substantially in the same manner as the UNet++ architecture.

3. The method of claim 1 wherein the classification model operates substantially in the same manner as a trained EfficientNetV2 neural network model.

4. The method of claim 1 further comprising pre-processing the first dataset by performing one or more augmentation procedures on the one or more images, the one or more augmentation procedures comprising at least one of:
   mosaic augmentation,
   normalization,
   random perspective augmentation, or
   colorspace augmentation.

5. The method of claim 1 further comprising training the classification model to assign one of a predetermined plurality of tread wear classifications to depictions of tires.

6. The method of claim 5 wherein the classification model uses a convolutional neural network with residual blocks.

7. The method of claim 1 further comprising transforming at least some images in the first dataset prior to training the classification model, wherein the transforming includes at least one of:
   resizing the at least some images;
   performing a random horizontal flip of the at least some images;
   performing a random vertical flip of the at least some images;
   performing a Gaussian blur of the at least some images; or
   performing a random crop of the at least some images.

8. The method of claim 1 further comprising performing one or more transformations on the one or more images prior to providing the one or more digital images to the classification model, wherein the one or more transformations include at least one deterministic transformation and no random transformations.

9. The method of claim 1 wherein the alert is generated and sent at a time that is based, at least in part, on the predicted remaining life of the tire.

10. The method of claim 1, wherein causing the alert to be displayed on a display associated with the electric vehicle charging station comprises causing the alert to be displayed on a mobile app used by a driver of the vehicle to check-in, authenticate, or pay for a charge session at the electric vehicle charging station.

11. A method comprising:
   capturing one or more digital images that include a depiction of a tire, wherein the one or more digital images are captured by one or more cameras incorporated into an electric vehicle charging station as a vehicle that includes the tire approaches or is parked at the electric vehicle charging station, wherein the electric vehicle charging station includes a computing device;
   generating, by the computing device of the electric vehicle charging station using an object detection model trained on a first dataset of images containing tires, a representation of a location of the tire for each digital image in the one or more digital images, wherein the representation of the location of the tire comprises a predicted bounding box that highlights a predicted location of the tire in the digital image;
   providing, by the computing device of the electric vehicle charging station, the one or more digital images and corresponding representations of the location of the tire to a classification model trained on a second dataset of images consisting of close-up views of tires;
   generating, by the computing device of the electric vehicle charging station using the classification model, a classification of the tread of the tire based on the one or more digital images and the corresponding representations of the location of the tire;
   determining, by the computing device of the electric vehicle charging station using a trained machine learning engine based at least in part on the classification of the tread of the tire, a predicted remaining life of the tire representing a duration of time until the tread of the tire will be worn;
   generating, by the computing device of the electric vehicle charging station, an alert that is based, at least in part, on a classification of the tread of the tire and the predicted remaining life of the tire; and
   causing the alert to be displayed on a display associated with the electric vehicle charging station.

12. The method of claim 11 wherein capturing the one or more digital images is performed by capturing multiple images of the tire over a period of time, the method further comprising:
   identifying an inconsistency between predicted bounding boxes, for the tire, determined by the object detection model for two or more consecutive images of the tire; and
   dropping the predicted bounding boxes for the two or more consecutive images of the tire.

13. One or more non-transitory storage media storing instructions which, when executed by one or more computing devices, cause:
   capturing one or more digital images that include a depiction of a tire, wherein the one or more digital images are captured by one or more cameras incorporated into an electric vehicle charging station as a vehicle that includes the tire approaches or is parked at the electric vehicle charging station, wherein the electric vehicle charging station includes a computing device;
   generating, by the computing device of the electric vehicle charging station using an object detection model trained on a first dataset of images containing tires, a representation of a location of the tire for each digital image in the one or more digital images, wherein:
      the object detection model comprises a semantic segmentation model; and
      the representation of the location of the tire comprises a pixel-wise segmentation mask that highlights the location of the tire in the digital image;
   providing, by the computing device of the electric vehicle charging station, the one or more digital images and corresponding representations of the location of the tire to a classification model trained on a second dataset of images consisting of close-up views of tires;
   generating, by the computing device of the electric vehicle charging station using the classification model, a classification of the tread of the tire based on the one or more digital images and the corresponding representations of the location of the tire;
   determining, by the computing device of the electric vehicle charging station using a trained machine learning engine based at least in part on the classification of the tread of the tire, a predicted remaining life of the tire representing a duration of time until the tread of the tire will be worn; and generating, by the computing device of the electric vehicle charging station, an alert that is based, at least in part, on the classification of the tread of the tire and the predicted remaining life of the tire.

14. The one or more non-transitory storage media of claim 13 wherein:

capturing the one or more digital images is performed by capturing multiple images of the tire over a period of time; and the instructions include instructions for:

identifying an inconsistency between predicted bounding boxes, for the tire, determined by the object detection model for two or more consecutive images of the tire; and dropping the predicted bounding boxes for the two or more consecutive images of the tire.

15. The one or more non-transitory storage media of claim 13 wherein the alert is generated and sent at a time that is based, at least in part, on the predicted remaining life of the tire.

16. The one or more non-transitory storage media of claim 13 wherein causing the alert to be displayed on a display associated with the electric vehicle charging station comprises causing the alert to be displayed on a mobile app used by a driver of the vehicle to check-in, authenticate, or pay for a charge session at the electric vehicle charging station.

17. The one or more non-transitory storage media of claim 13 wherein the instructions, when executed by the one or more computing devices, further cause pre-processing the first dataset by performing one or more augmentation procedures on the one or more images, the one or more augmentation procedures comprising at least one of:

mosaic augmentation, normalization, random perspective augmentation, or colorspace augmentation.

18. The one or more non-transitory storage media of claim 13 wherein the instructions, when executed by the one or more computing devices, further cause transforming at least some images in the first dataset prior to training the classification model, wherein the transforming includes at least one of:

resizing the at least some images;

performing a random horizontal flip of the at least some images;

performing a random vertical flip of the at least some images;

performing a Gaussian blur of the at least some images; or performing a random crop of the at least some images.

19. The one or more non-transitory storage media of claim 13 further comprising performing one or more transformations on the one or more images prior to providing the one or more digital images to the classification model, wherein the one or more transformations include at least one deterministic transformation and no random transformations.

* * * * *